(12) United States Patent
Rittenhouse

(10) Patent No.: US 7,343,991 B2
(45) Date of Patent: Mar. 18, 2008

(54) ELECTRICALLY DRIVEN TRACK WHEELS FOR TRACKED VEHICLES

(76) Inventor: Norman Rittenhouse, 1001 N. First St., Fairbury, IL (US) 61739

( * ) Notice: Subject to any disclaimer, the term of this patent is extended or adjusted under 35 U.S.C. 154(b) by 0 days.

(21) Appl. No.: 11/454,198

(22) Filed: Jun. 15, 2006

(65) Prior Publication Data

US 2007/0199749 A1 Aug. 30, 2007

Related U.S. Application Data

(60) Provisional application No. 60/776,778, filed on Feb. 24, 2006.

(51) Int. Cl.
*B62D 55/00* (2006.01)
*B62D 55/12* (2006.01)

(52) U.S. Cl. ............ 180/9.5; 180/9.36; 180/9.34; 180/9.46; 180/9.62; 180/6.5; 180/9.1; 301/114; 301/112; 301/67 R; 301/49 R; 301/71; 301/179; 301/180

(58) Field of Classification Search .......... 180/9.5, 180/9.36, 9.34, 9.46, 9.62, 6.5, 9.1, 4.5; 310/114, 310/112, 69 R, 49 R, 71, 179, 180, 75 C, 310/67 A See application file for complete search history.

(56) References Cited

U.S. PATENT DOCUMENTS

| | | | | |
|---|---|---|---|---|
| 4,671,369 A | * | 6/1987 | Tiffin et al. ............. | 180/8.1 |
| 5,533,587 A | | 7/1996 | Dow et al. ............... | 180/235 |
| 5,647,721 A | * | 7/1997 | Rohrbaugh ............... | 414/686 |
| 5,834,865 A | * | 11/1998 | Sugiura ..................... | 310/49 R |
| 6,044,921 A | | 4/2000 | Lansberry ................ | 180/9.36 |
| 6,220,377 B1 | | 4/2001 | Lansberry ................ | 180/9.36 |
| 6,259,176 B1 | * | 7/2001 | Isozaki et al. ............. | 310/49 R |
| 6,325,167 B1 | * | 12/2001 | Jiang ....................... | 180/9.32 |
| 6,435,292 B2 | * | 8/2002 | Lemke et al. ............. | 180/9.62 |
| 6,860,571 B2 | * | 3/2005 | Scheetz ..................... | 305/143 |
| 2001/0001993 A1 | * | 5/2001 | Lemke et al. ............. | 180/9.5 |
| 2003/0116364 A1 | * | 6/2003 | Simmons ................... | 180/9.5 |
| 2003/0116366 A1 | * | 6/2003 | Simmons ................... | 180/9.62 |
| 2003/0127258 A1 | * | 7/2003 | Lansberry ................ | 180/9.36 |
| 2004/0168837 A1 | * | 9/2004 | Michaud et al. ........... | 180/9.46 |

* cited by examiner

*Primary Examiner*—Lesley D. Morris
*Assistant Examiner*—Marlon Arce-Diaz
(74) *Attorney, Agent, or Firm*—Brian S. Steinberger; Phyllis K. Wood; Law Offices of Brian S. Steinberger, P.A.

(57) ABSTRACT

An electrically driven wheel for a tracked vehicle which includes a driving track wheel with built in cogs and a brushless DC motor having a mounting shaft to connect the wheels to the tracked vehicle. The brushless DC motor is coupled within the driving track wheel to develop rotational torque for rotating the driving track wheel and includes a drum, a bank of pole assemblies connected between the drum and the stationary mounting shaft, and electrical wiring for energizing the bank of pole assemblies. In an embodiment, the brushless DC motor includes permanent magnet high multiple pole motors. The electrically driven wheels are part of a drive system for the tracked vehicle. The drive system includes a track module frame, at least two flexible tracks coupled with the electrically driven track wheels, and a controller for controlling the electrically driven track wheels in response to a driver command.

27 Claims, 14 Drawing Sheets

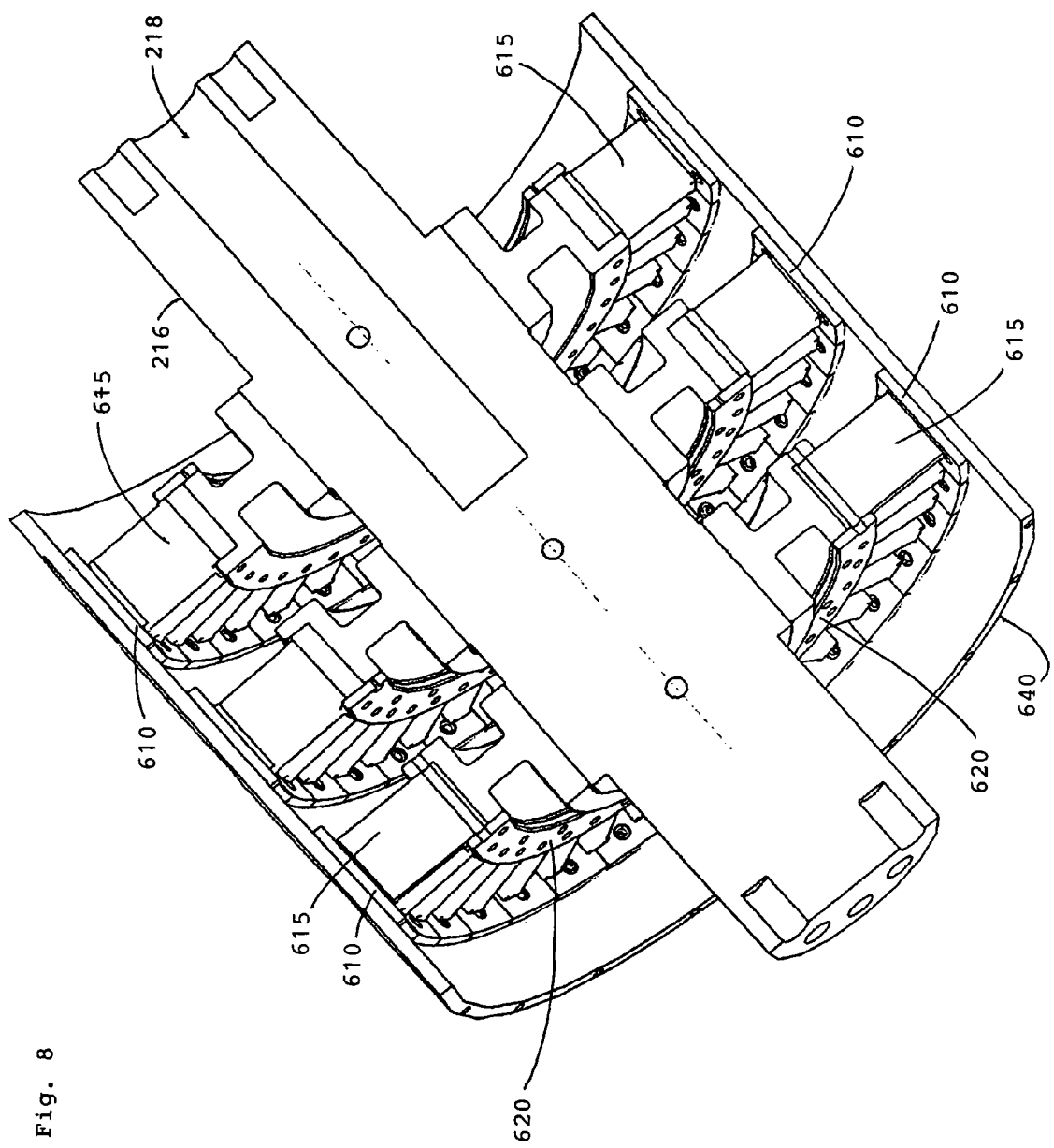

TO CONTROL SYSTEM

REAR VIEW

RIGHT SIDE VIEW

ELECTRICALLY DRIVEN TRACK WHEELS FOR TRACKED VEHICLES

This invention claims the benefit of priority to U.S. Provisional Patent Application No. 60/776,778 filed on Feb. 24, 2006.

FIELD OF THE INVENTION

This invention relates to vehicles, in particular to environmentally friendly electrically driven track wheels for tracked vehicles, and related devices, apparatus and methods of operation thereof.

BACKGROUND AND PRIOR ART

Oil exploration has been difficult in sensitive environments such as the North Slope of Alaska since current vehicles can damage and destroy those environments. For example, vehicles having separate wheels can cause deformation to the ground and gouging of the ground surface while being operated. It is highly desirable under certain environmentally sensitive conditions to have a tracked vehicle which causes the least deformation of the ground as possible. Such uses include operation across frozen tundra typical of the ANWR region of the North Slope of Alaska.

While wheeled vehicles typically have highly refined independent suspension systems, tracked vehicles have been limited to rigid, non-compliant suspension systems. This has been a necessity partly due to the driving track wheels being rigidly mounted to the power train. Because of this rigid mounting, the vehicle causes the ground to conform to the track system, rather than the other way around.

Most tracked vehicles are powered by mechanically driven track wheels which are prone to problems. Tracked wheels are not known to have independent suspensions. Although better than separate wheeled vehicles, traditional tracked wheels such as those found on tractors, military vehicles and the like, have been also known to damage and gouge a ground surface.

U.S. Pat. No. 5,533,587 issued to Dow et al. on Jul. 9, 1996 discloses an articulated tracked vehicle for agricultural harvesting which reduces damage to fields and can be driven on paved roads at reasonable speeds. The vehicle has front and rear elements, linked by an articulating joint which permits turning and rotation of one element with respect to the other. Each element is motivated by a pair of tracked power units which are hydraulically driven by a heavy duty differential between the units. Each power unit is rotatably mounted solely on a shaft sleeve of the differential and is free to oscillate vertically and independently to absorb irregularities in its path. Each unit includes an endless elastomeric track which has two rows of lugs on its inner surface. A novel drive mechanism engages these lugs to motivate the vehicle. A sealed transmission housing in each power unit protects key drive elements from environmental damage without interfering with operation of the unit. The transmission is centrally disposed within each power unit to provide further protection from damage.

U.S. Pat. Nos. 6,044,921 and 6,220,377 issued to Lansberry on Apr. 4, 2000 and on Apr. 24, 2001, respectively, describes a vehicle with a driving track assembly and a pair of secondary driving assemblies disposed on opposing lateral sides of the track. Each secondary driving structure includes a ground engaging wheel. The driving track assembly includes an endless ground engaging track that drives the vehicle. The flanking driving structures also engage the ground and are rotated to impart force to the vehicle. A steering device is operatively connected to the secondary driving assemblies so as to affect a vehicle steering operation, wherein the ground engaging driving structures are operated to turn said vehicle with respect to said vehicle driving direction. Preferably, the force imparted to the vehicle by one of said ground engaging driving structures is greater than the force imparted to the vehicle by the other of the ground engaging driving structures, thereby causing the vehicle to turn with respect to the vehicle driving direction.

The '377 includes a secondary driving and steering structure includes a ground engaging driving and steering structure that is preferably a ground engaging wheel wherein the steering device is operatively connected to the secondary driving and steering assemblies. Preferably, the steering device control is operable to transfer a substantial portion of the load support from the central driving track assembly during straight ahead movement onto the secondary driving and steering assemblies during turning movements.

The Lansberry patents relate to vehicles for use on a wide range of terrain, including uneven and/or steep terrain having a variety of soil conditions. They also describe use of DC magnet motors for driving and alternate version of the vehicle. The DC permanent magnet motors that have a transmission incorporated in the motor, has fewer than ten moving parts and the transmission portion ensures that sufficient torque is available for rugged terrain.

However, the prior art fails to provide a track system that conforms to the ground, rather than the other way around. What is needed is a vehicle having a track system including electrically controlled wheels so that when the vehicle is traveling on environmentally sensitive terrain the vehicle causes the least deformation of the ground as possible.

SUMMARY OF THE INVENTION

A primary objective of the present invention is to provide tracked vehicle, and related apparatus, devices and methods of operating the tracked vehicle where the driving track wheels are not mechanically connected to the power train, or to the main physical frame of the vehicle.

A secondary objective of the present invention is to provide tracked vehicle, and related apparatus, devices and methods of operating the tracked vehicle which causes the least deformation of the ground as possible, and is most useful in environmentally sensitive areas such as the frozen tundra typical of the ANWR region of the North Slope of Alaska. By using a completely compliant, independent suspension of a tracked vehicle, it is possible to operate under sensitive conditions with a very low footprint signature, which minimizes any deformation to the environment.

A third objective of the present invention is to provide tracked vehicle, and related apparatus, devices and methods of operating the tracked vehicle which uses electrically driven, direct drive PM brushless DC motor contained within the actual driving track cogged wheel and requiring no gearbox.

The novel tracked vehicle has many features/advantages such as:

1. Fully articulated for less damage to frozen tundra, sensitive soil conditions.
2. Direct drive motor inside track wheel, needing no gearbox or transmission.
3. Track directly driven by cogged track wheel.
4. Four track wheels each electrically powered to distribute stress in track for less environmental disturbance.

5. Track wheel motors are permanent magnet high multiple pole for precise track control and sync.
6. Two independent motors and electronic drives per track allow get-home capability in event of failure of a single drive motor or electronic drive or related components.
7. Motor is "inside out"—shaft is stationary, outer case turns—for simplified installation and elimination of gear boxes.
8. Motor end plates directly mount track wheel and transmit thrust loads directly to motor bearings and to mounting shaft—main drum sees no thrust loads, only develops rotational torque.
9. Full torque is available in either direction.
10. Control system allows automatic protection against overload, over current, over speed, too tight turns at high speed, top speed vs. G-loads of rough terrain.
11. Motor is sealed, pressurized with inert gas for water protection.
12. Motor is cooled/heated with liquid coolant, such as Freon etholene gycol, etc.
13. Electric drive track assemblies permit increased and adjustable ground clearance.
14. Special permanent magnet material and mounting permit operations as low as −50 degrees C. and as high as +50 degrees C.
15. Hollow axle shaft assembly permits wiring and coolant lines to operate motor through non rotating part of motor, and allow motor to be sealed against environment.
16. No oil spills or water contamination.
17. Permanent magnet electric motor drive allows efficiency over 95% without traditional heat losses to clutches, gear boxes, differentials, hydraulics, etc., for less heat loss to affect environment by melting frozen tundra. Motor temperature stays very close to ambient.

A first embodiment of the present invention provides an electrically driven wheel for a tracked vehicle. The electrically driven wheels includes a driving track wheel with built in cogs on an outer surface for driving a track and a brushless DC motor having a stationary mounting shaft for connecting the electrically driven wheel to a frame of the tracked vehicle, wherein the brushless DC motor is coupled within the driving track wheel to develop rotational torque for rotating the driving track wheel. End plates covering each end of the driving track wheel enclosing the brushless DC motor, wherein the driving track wheel directly transmits thrust loads directly to the mounting shaft. The brushless DC motor includes a drum having an interior and an exterior surface, a bank of pole assemblies connected between the interior surface of the drum and the stationary mounting shaft, and electrical wiring for energizing the bank of pole assemblies, wherein the electrical wiring is routed through a hollow portion of the stationary mounting shaft between said brushless DC motor and a tracked vehicle controller. In an embodiment, the brushless DC motor includes permanent magnet high multiple pole motors for precise track control and synchronization.

A second embodiment of the present invention provides drive system for a tracked vehicle. The drive system includes a track module frame for connecting the drive system with a chassis of the tracked vehicle, at least four electrically driven track wheels connected with the track module frame, at least two flexible tracks each coupled with two of the at least four electrically driven track wheels, wherein each of the at least two flexible tracks travel around the corresponding two electrically driven track wheels, and a controller for controlling the at least four electrically driven track wheels in response to a driver command.

In an embodiment, the at least one drive system is connected to the tracked vehicle chassis to provide independent control for vertical movement, tilting (angular) movement and torsional movement and an adjustable height control for adjusting a ground clearance of the track vehicle to compensate for different terrain slopes to provide a smoother, safer ride, with bump absorption, improved stability, and a faster allowable speed of navigation over uneven surfaces.

Further objects and advantages of this invention will be apparent from the following detailed description of the presently preferred embodiments which are illustrated schematically in the accompanying drawings.

BRIEF DESCRIPTION OF THE FIGURES

FIG. 8 is another cross sectional perspective side view of the brushless DC motor shown in FIG. 6 sliced parallel to the wheel mounting shaft.

FIG. 9 is an exploded view showing the parts of the brushless DC motor shown in FIG. 7a.

DESCRIPTION OF THE PREFERRED EMBODIMENTS

Figure 1:
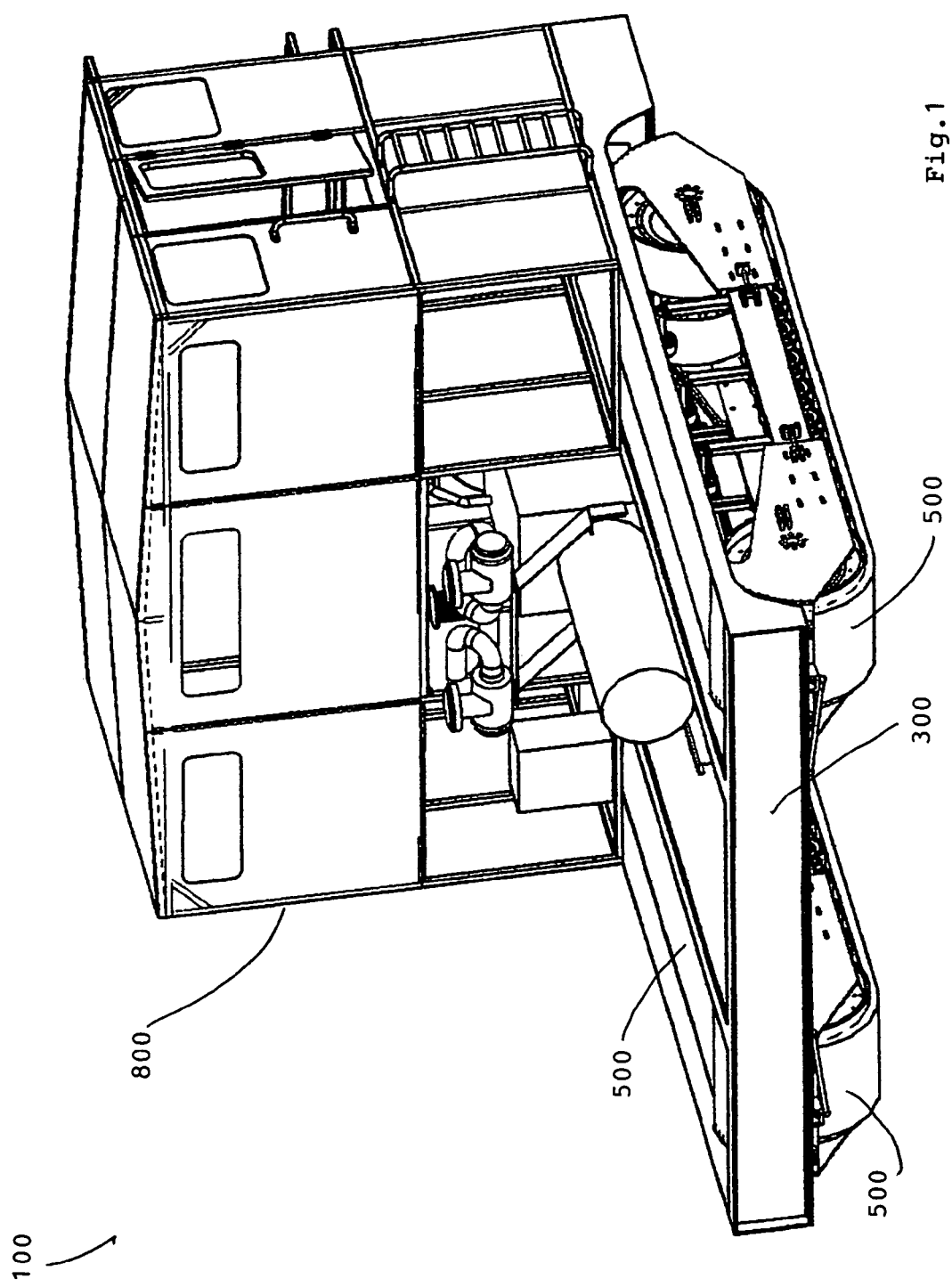
FIG. 1 is a perspective view of a tracked vehicle using the electrically driven wheels according to the present invention.
Figure 2:
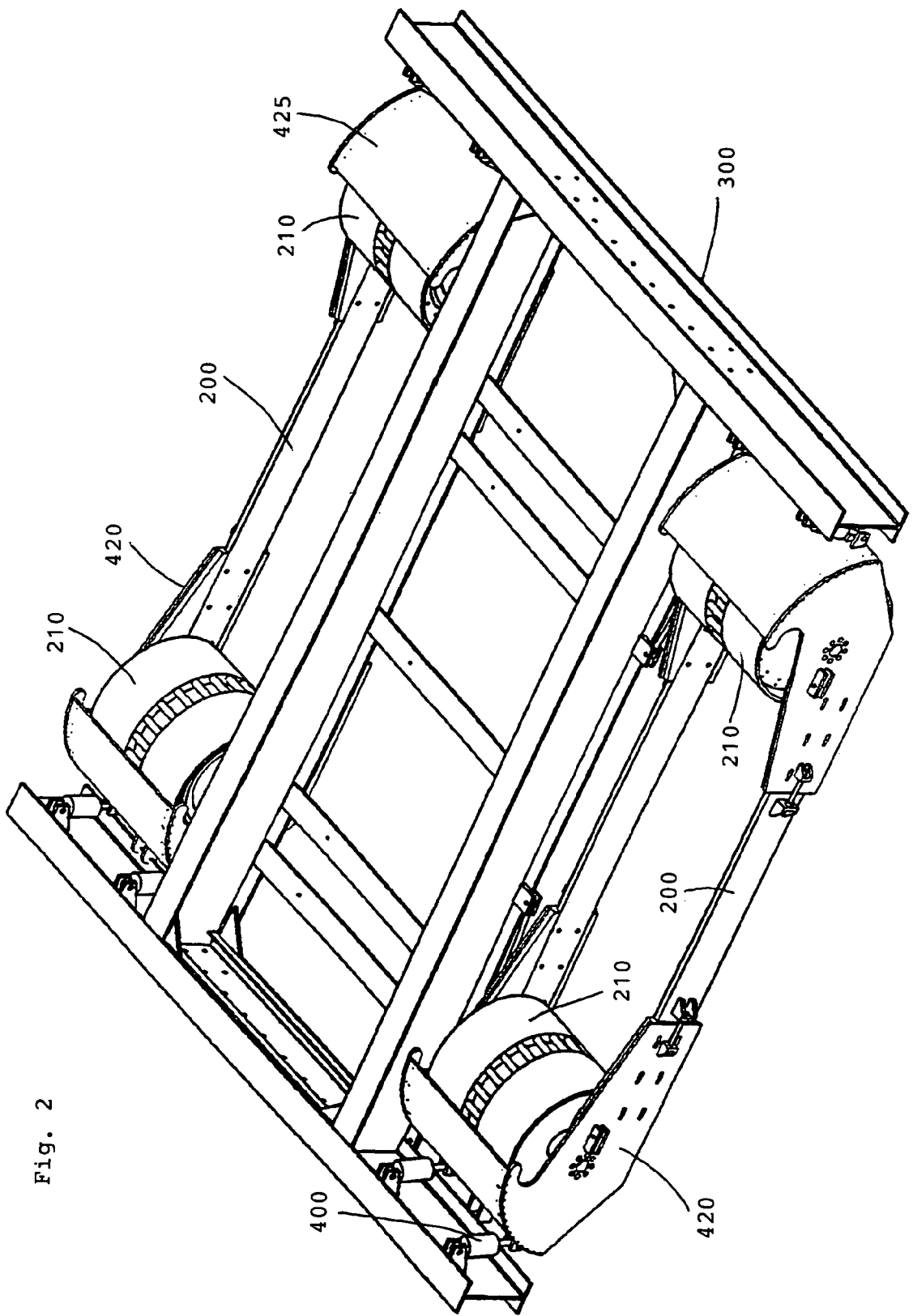
FIG. 2 is a perspective view showing the frame with suspension system and electrically driven wheels of FIG. 1.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.
100 tracked vehicle 200 parallel track module frame
205 track module frame side
210 electrically driven wheels
212 driving track wheel
214 brushless DC motor
216 motor mounting shaft
217 spacer
218 hollow core
220 built in cogs
300 vehicle chassis frame
400 vehicle suspension
416 mounting plate
420 curved suspension plate
425 cover
500 track
610 bank of magnets
615 pole
620 mounting disk 10
630 inner end plate
635 outer end plate
650 outer drum
655 inside of outer drum
700 drive control electronics 15
702 front sensors
704 rear sensors
712 slave motor controllers
714 master motor controllers
730 pilot control
740 electrical power source
745 batter pack
750 brake controller
755 braking resistor
800 pilothouse
810 pilot controller FIG. 1 is a perspective view of a tracked vehicle using the electrically driven wheels and FIG. 2 is a perspective view of the electrically driven wheels connected with the suspension system and frame of the tracked vehicle shown in FIG. 1. As shown in FIG. 2, the suspension system 400 is connected with the vehicle chassis frame 300 and the track module frame 200. The electrically driven wheels 210 are connected to the curved endplates 420 of the track module frame 200.

Figure 3:
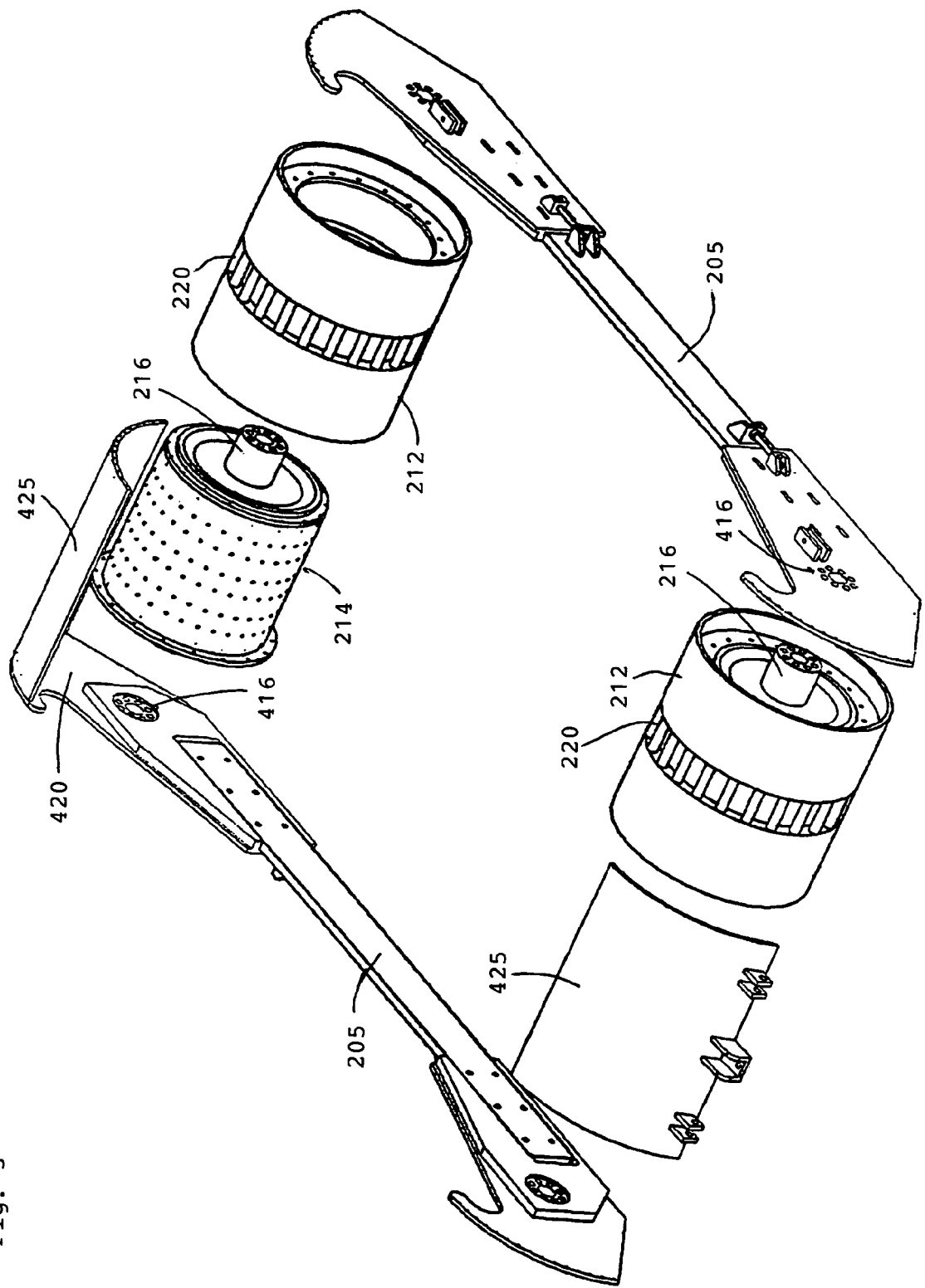
FIG. 3 is an exploded view of the wheels shown in FIG. 2.

FIG. 3 is an exploded perspective view of electrically driven wheels 210 and track module frame 200. As shown, the electrically driven wheels 210 includes a brushless DC motor 214 having a motor stationary mounting shaft 216 extending through the motor 214 for connecting the electrically driven wheels 210 with the track module frame 200. The track module frame 200 includes mounting holes 416 for connecting the motor stationary mounting shaft 216 of the electrically driven wheels 210 to the parallel track module frame 200 of the vehicle 100 which is connected to the vehicle chassis 300 via the suspension system 400. The ground clearance is greatly increased and can be made to be adjustable and can be changed at will, and can be individually varied to compensate for terrain slope.

As shown in FIG. 3, a direct drive, sealed, PM brushless DC Motor 214 is contained within driving track wheel 212. Parallel track module frames 205 bolt to both ends of the motor stationary mounting shaft 216 of the brushless DC motor 214. The left and right curved suspension attach plates 420 of the parallel track frame 200 includes mounting holes 416 for bolting each one of the motor stationary mounting shafts 216 between parallel left and right sides 210 of the track module frame 200.

Figure 4:
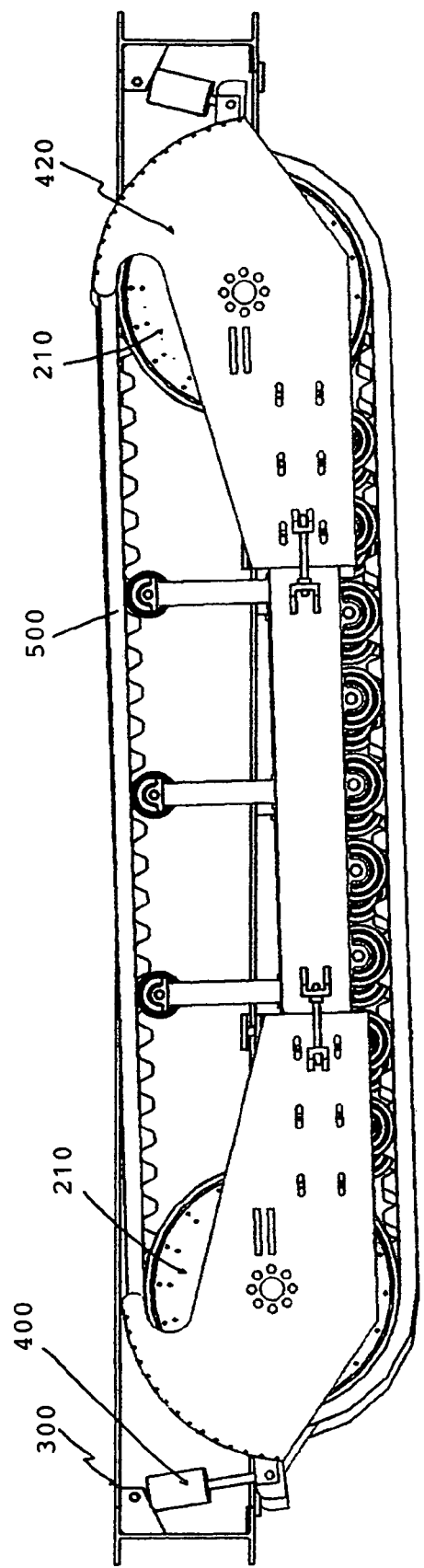
FIG. 4 is a side view of the track, driving track wheels and parallel track module frame connected with the tracked vehicle chassis.

FIG. 4 shows a side view of a front and rear electrically driven wheel 210 and parallel track frame 200 connected with the vehicle chassis frame 300. The track 500 is located between the top cover 425 of the track module frame 200 and the driving track wheel 212 of corresponding front and rear electrically driven wheels 210 which drive the track 500. The tracks 500 are driven by the self contained direct drive brushless DC motors 214 contained within the track driving wheel 212 which is an "inside out" configuration, wherein the central mounting shaft 216 is stationary and the outside of the brushless DC motor 214 turns.

The driving track wheels 212 are suspended using a suspension system configuration to allow each driving wheel 212 to have independent vertical movement, tilting (angular) movement, and torsional movement. This results in the track belt 500 having less stress which allows the track belt 500 to "give" or "follow" when encountering a high spot on the terrain instead of crushing the high spot with high concentration of vehicle weight on the high terrain spot.

By enclosing two track driving wheels 212 with integral brushless DC motors 214 or one track driving wheel and one idler wheel on a track frame module 300, the torque of the motor is distributed within the track frame module 300 in a self contained driving unit. The actual track 500 can be made of low temperature flexibility rubber tracks, or of special steel tracks, or of other materials as are well known in the art for use in non-uniform and/or environmentally sensitive terrain. The actual track 500 can be selected to have the ability to resiliently track uneven surfaces rather than flattening out the high spots, thus increasing track life and minimizing the disturbance to the terrain. This is especially important when traveling across environmentally sensitive terrain such as the tundra.

In the preferred embodiment, the track driving wheels 212 are powered by internal direct drive pulse modulated (PM) direct-current (DC) integral motors 214 to deliver twice the power to the ground and to evenly distribute the actual tensile stress on the track belt. As shown in FIG. 3, each track driving wheel 212 includes 360 degrees of built in clogs 220 for driving the track 500. Using this configuration, each track driving wheel 212 has over 180 degrees of contact between the built in cogs 220 and mating belt cogs (FIG. 4) on the inner surface of the track 500.

Two or more track frame modules 200 are used to power a complete vehicle. Additional track frame modules 200 can be used to power trailers or additional vehicles connected in tandem with the vehicle, making up a trailer train. By suspending the two or more track module frames 200 from the chassis 300 of the main vehicle 100, shocks encountered by the track frame modules 200 are not transmitted to the vehicle chassis frame 300. Additionally, the vehicle has a smoother, safer ride, with bump absorption, improved stability, and a faster allowable speed of navigation of uneven surfaces. The electrically driven wheels 210 connected to the vehicle chassis 300 using an advanced suspension system varies the amount of pressure in the individual suspension components, increase the ride height and ground clearance and provides a vehicle wherein tilt compensation can be adjusted and corrected.

By making the track frame modules as a self contained module, the vehicle has several advantages over the prior art. For example, the track frame modules can be made as interchangeable units, thus reducing parts count and lowering manufacturing cost and they can be shipped separately from the main vehicle chassis, reducing the total width to commonly acceptable allowable common carrier shipping widths. In the United States this is often twelve feet (12')

without undue restriction. Upon reaching the destination, the vehicle can be easily reassembled to its total width, which may be twenty feet (20') or more. Alternatively, the track frame module can be changed as a complete spare assembly if required, which is advantageous in extremely cold or otherwise hostile environments. Another advantage provided by the track frame module with parallel frame sides is the balancing of loads with in the module itself and driving motor torque is reacted to a very long track frame module.

As shown in FIG. 4, the track belt can be guided by the sides of the parallel track frame to reduce or eliminate the possibility of the belt becoming derailed from the driving track wheels 212. The belt tension can be regulated and adjusted by moving one of the track wheels 212 with integral driving motor 214 closer or further away from the other track wheel 212. This can be accomplished with hydraulic cylinders, pneumatic cylinders for air bags, powered jackscrews or manual jackscrews, in conjunction with sliding members coupled with the vehicle chassis frame. Additionally, the parallel frame sides 210 can be made to possess torsional compliance to allow each track wheel 210 to tilt at a different angle according to the localized terrain irregularities encountered.

The present invention centers around the electrically driven, direct drive PM brushless DC motor 214 contained within the actual driving track cogged wheel 210. According to the present invention, the brushless DC motor 214 is enclosed completely within the driving track wheel 212, to directly drive the track wheel 210 without need for gearboxes to provide starting torque in excess of 30,000 foot pounds, to provide a wide speed range, efficiency over 95%, to operate from −50 c to +50 c, to be sealed against water and other contaminants, to operate without ordinary maintenance, to allow extreme precision of speed control and torque matching between motors, and to tolerate very high G-loads.

Figure 5B:
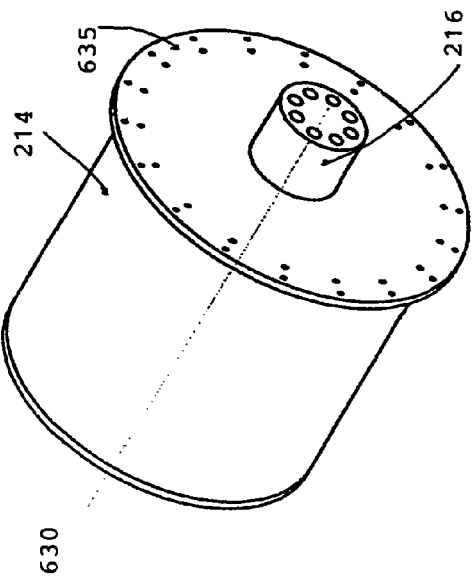
FIGS. 5a and 5b show three-quarter angle perspective views of the inside and outside end plates of the electrically driven wheel showing the motor mounting shaft extending through the center
Figure 5D:
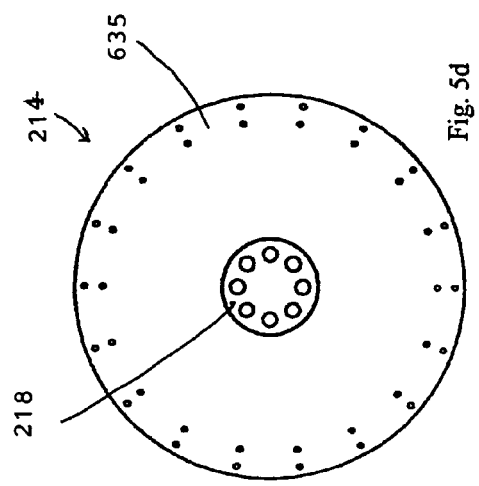
FIGS. 5c and 5d show left and right end views of the brushless DC motor corresponding to the side views shown in FIGS. 5a and 5b, respectively.
Figure 5A:
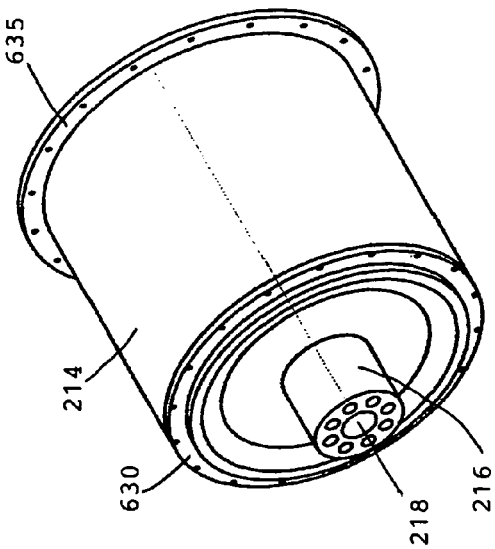
Figure 5E:
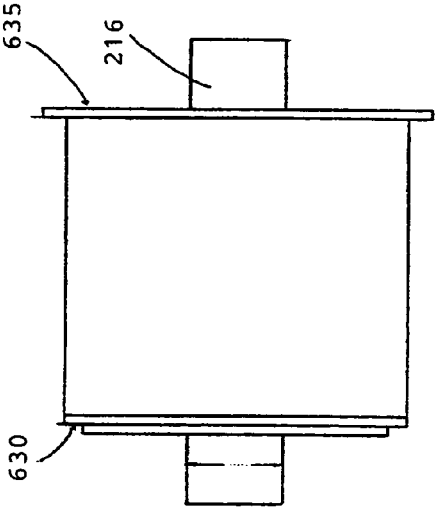
FIG. 5e shows a top view of the wheel.
Figure 5C:
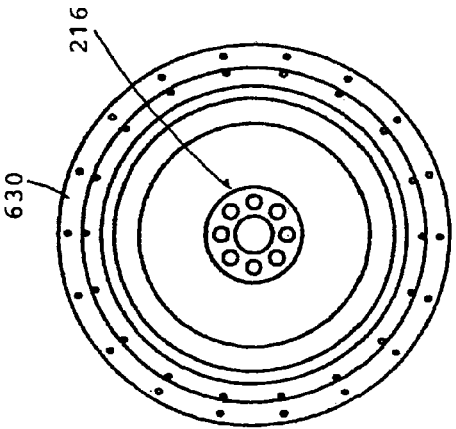

FIG. 5a through 5e show alternative views of the brushless DC motor 214 of the electrically driven wheels 210. FIGS. 5a and 5b show three-quarter angle perspective views of the inside and outside end plates 630 and 635 of the electrically driven wheel 214 showing the motor mounting shaft 216 extending through the center. FIGS. 4c and 4d show the corresponding inside and outside end views of the brushless DC motor 214 and FIG. 4e shows a top view of the brushless DC motor 214.

In the preferred embodiment, the end plates of the motor are CNC machined from steel billet, for maximum strength and the end plates support the entire weight of the vehicle, but are only subjected to radial static loads, not any torsional loads. The inner and outer end plates 630 and 635, respectively, are machined differently to accept the inner and outer races of the track wheel 212, which bolts to the motor end plates. Thus, the weight of the vehicle is transmitted through the wheel 210 to the end plates, to the motor bearings, to the mounting axles (shaft) 206, to the track assembly frames 200.

Permanent Magnet PM brushless motors were first described in a research paper published in 1962, but practical applications awaited more powerful magnets, and more sophisticated electronic control systems. Now, the technology exists to make large, powerful and efficient PM Brushless motors. The present invention uses permanent magnet DC brushless motors for driving the wheels of a vehicle.

Figure 6:
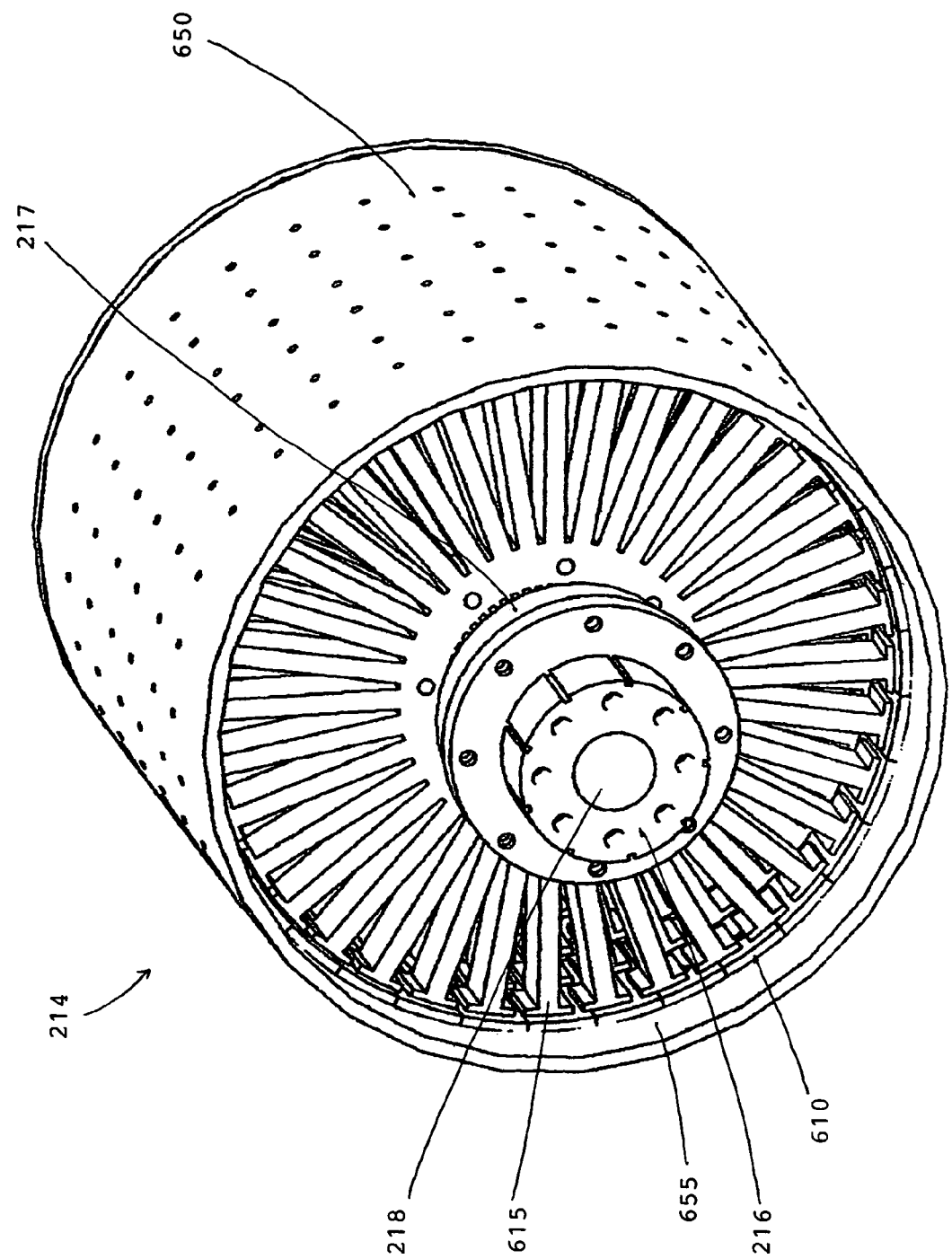
FIG. 6 is an enlarged perspective side view of the brushless DC motor shown in FIGS. 5a through 5e.
Figure 7A:
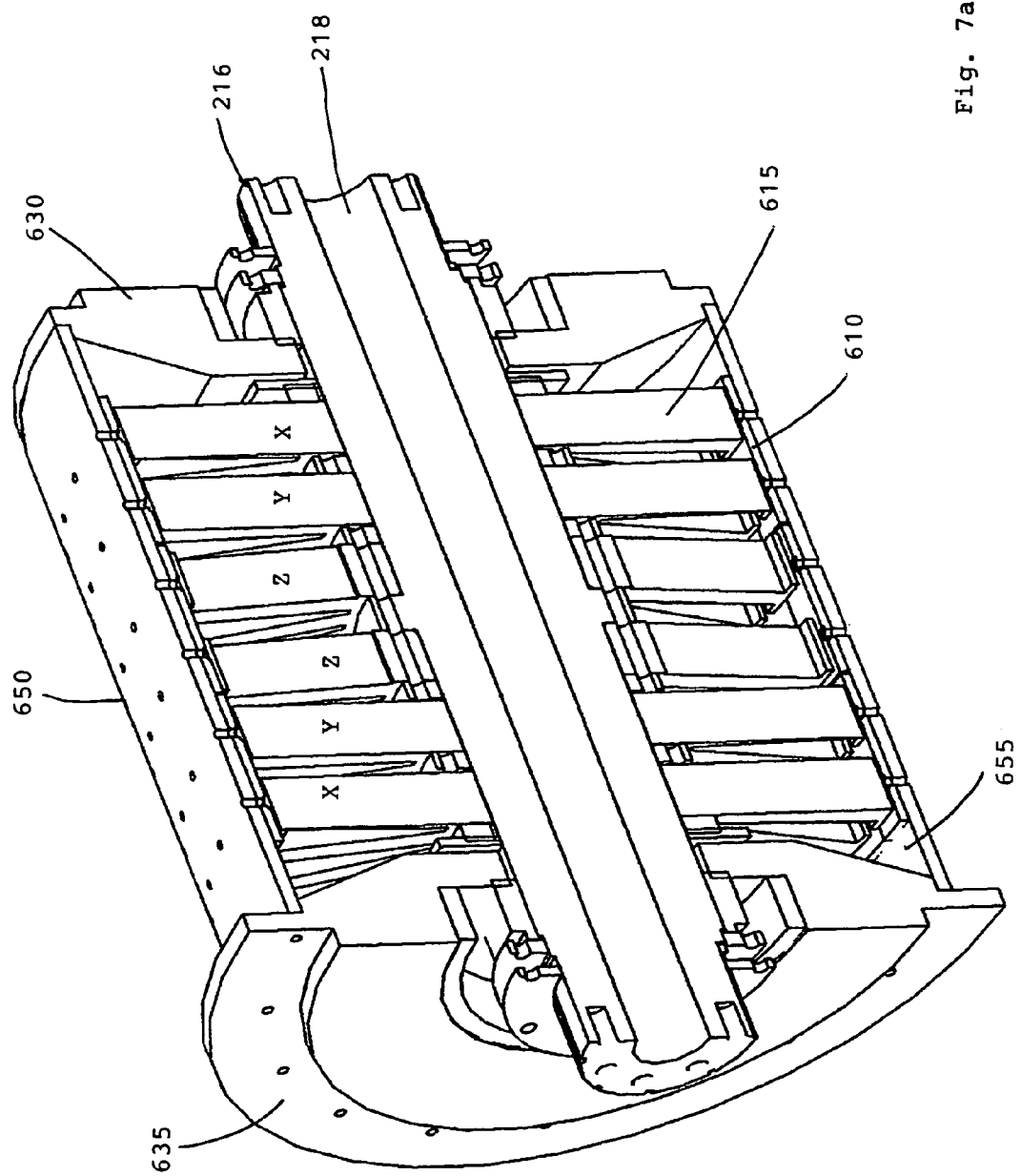
FIGS. 7a and 7b are cross sectional side views of the brushless DC motor shown in FIG. 6 sliced perpendicular to the wheel mounting shaft for a double and a single pair stator.
Figure 7B:
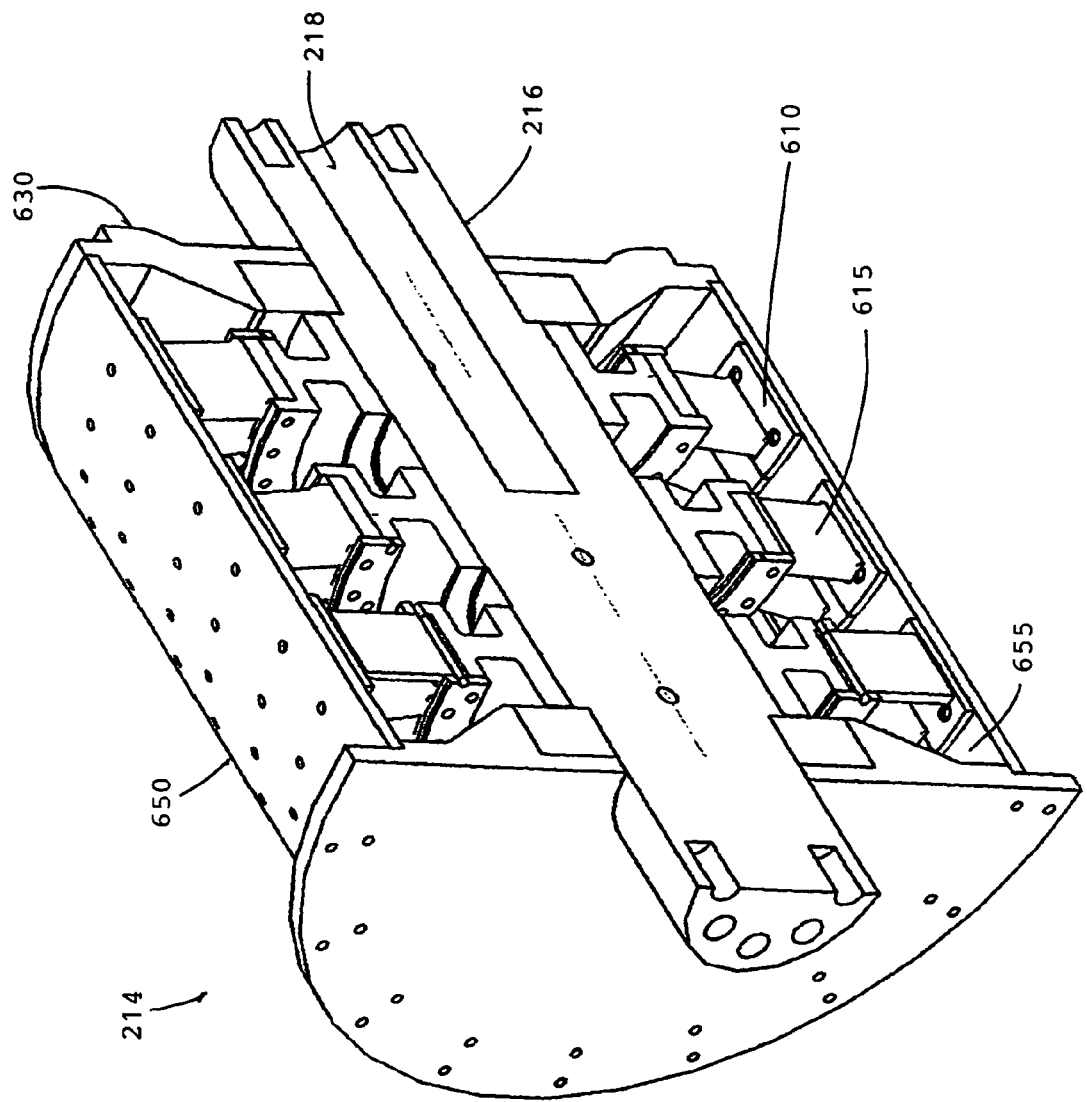

FIG. 6 is a perspective view of an example of a brushless DC motor 212 with a stationary mounting shaft 216 for connecting the brushless DC motor 210 to the track module frame 200. FIGS. 7a and 7b are perspective cross-sectional views of the interior of the double and single stator pair, respectively, motor sliced perpendicular to the motor shaft 216. The motor features a three phase arrangement, with three sets of stator windings 615 that are mounted on the stationary mounting shaft 216 and three rows of very high strength Neodymium-iron-boron magnets 610. The magnets 610 can be arranged in three, six or nine discs which turn with the outside drum of the motor, or can be directly fastened to the inside of the outer drum for maximum mechanical advantage. As shown in FIG. 7a, the "X" phase 36 pole 615 stator assembly 630 is mounted to the shaft 216 through its mounting disc 620. The 36 Neodymium Permanent Magnets 610 are fastened to the inside 655 of the motor outer drum assembly 650. These Permanent Magnets are alternately "North" and "South" magnetic orientation.

Figure 9:
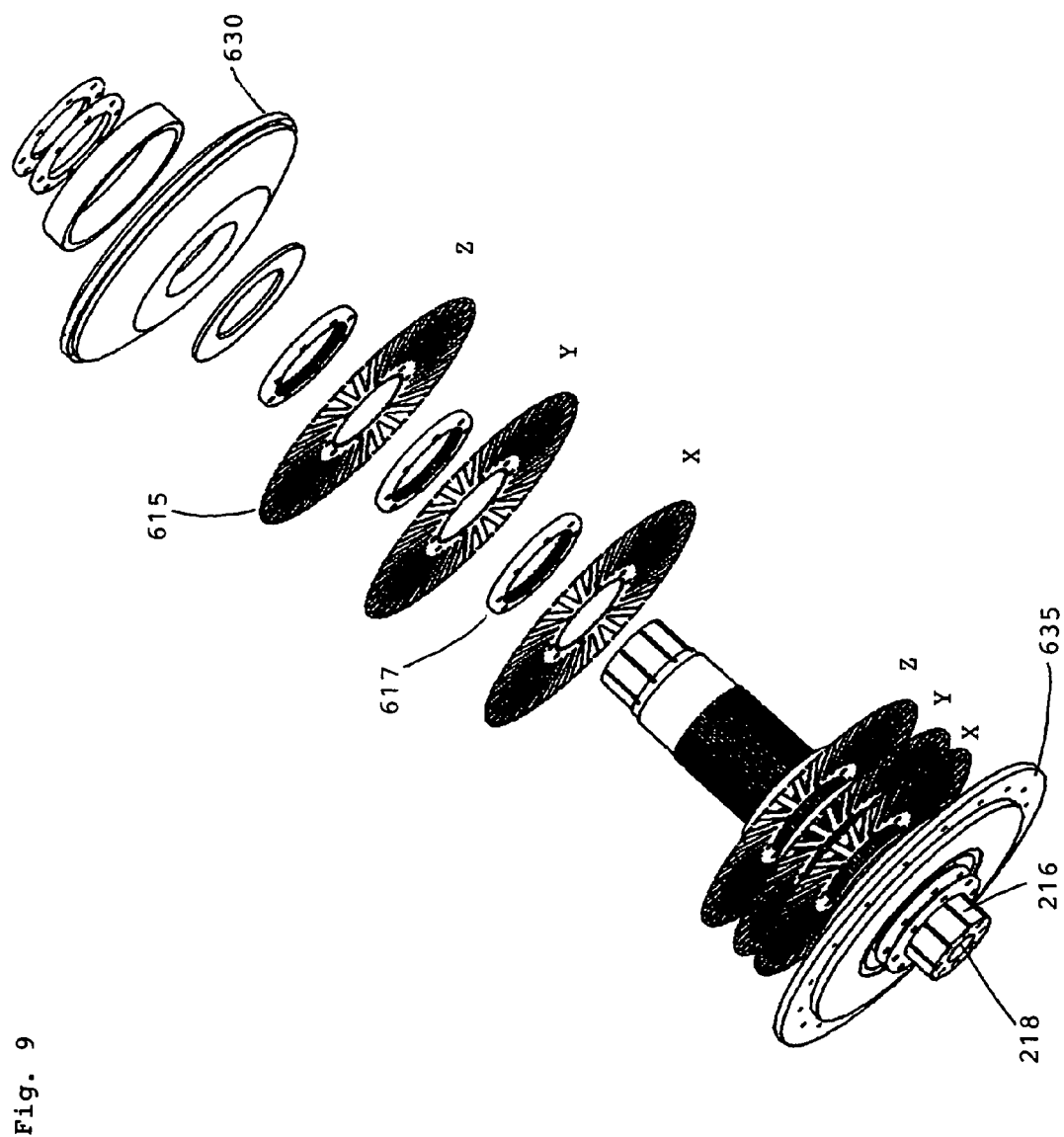

FIG. 8 is another cross-sectional perspective view of the motor 214, this time sliced parallel to the motor mounting shaft 216. Three sets of stator electromagnet assemblies (X, Y, Z) are each mounted to the shaft 216 through their mounting discs 620. The three sets of 36 permanent magnets 610 are attached to the inside of the outer drum assembly 250 with both epoxy and mechanical fasteners. Individual electromagnet poles are identified as 615. The offset differences of the three sets of electromagnet stators (X, Y, Z) are 0.0, −6.66, and −13.3 degrees, respectively. The drum arrangement is shown in FIGS. 7-9 for simplicity, although alternatively, the disc arrangement can also be substituted.

Whereas AC induction motors have very poor starting torque and efficiency, the motor described for use in the present invention actually has its maximum torque at start and at very low speed making it an ideal component for a tracked vehicle, which often is operated for long periods of time at crawling speeds. The name frequently given to this type of vehicle is "crawler tractor". The motor of the present invention is well suited for this application, giving off minimum heat at low speed.

According to the present invention, at any given moment, at least two sets of 36 poles each are energized. Generally one set is pulling (attraction of poles), one set is pushing (repulsion of poles) and one set is approaching zero switchover. This results in very high torque levels. Full torque and power is available in either direction, meaning that the motors can be interchangeably used for right hand and left hand installations. Turning, speed control and braking is handled electronically, with electronic torque matching between pairs of driving motors in the track assemblies. Only parking brakes are added. The stationary motor mounting shaft 216 is hollow on one end 218, permitting the power wires, position feedback sensor wires, and coolant lines to interconnect, while allowing the motor to be sealed against outside elements.

Three discs 615 are keyed to the inner shaft 216, each holding multiple pole high strength electromagnets 610. Increasing the number of poles 615 increases the starting torque at the expense of top speed. In this example, 36 poles 615 are used, although an alternative even number can be used. The motor according to this example produces approximately 30,000 Foot pounds of starting torque with a top speed of approximately 200 RPM's at 60 HZ input. This translates to a top vehicle speed of approximately 20 MPH at 60 Hertz, or more with a higher top Hertz input. Alternative combinations of torque and speed are available by varying the number of poles used.

As shown in FIG. 9, permanent Magnets can be arranged every 10 degrees in a linear, end to end configuration and the 36 stator windings are also spaced every 10 degrees. The three phases of power are accommodated by staggering the keying of the stator discs as:

Phase "X"—reference to zero degrees offset
Phase "Y"—reference to −6.66 degrees offset lagging for a 36 pole stator
Phase "Z"—reference to −13.32 degrees offset lagging for a 36 pole stator For high efficiency at any operating speed and for zero speed start, it is necessary for the controlling electronics to "know" the exact location of the permanent magnets with reference to the stator electromagnets, so that the proper coils are energized and in the proper magnetic direction.

Figure 10:
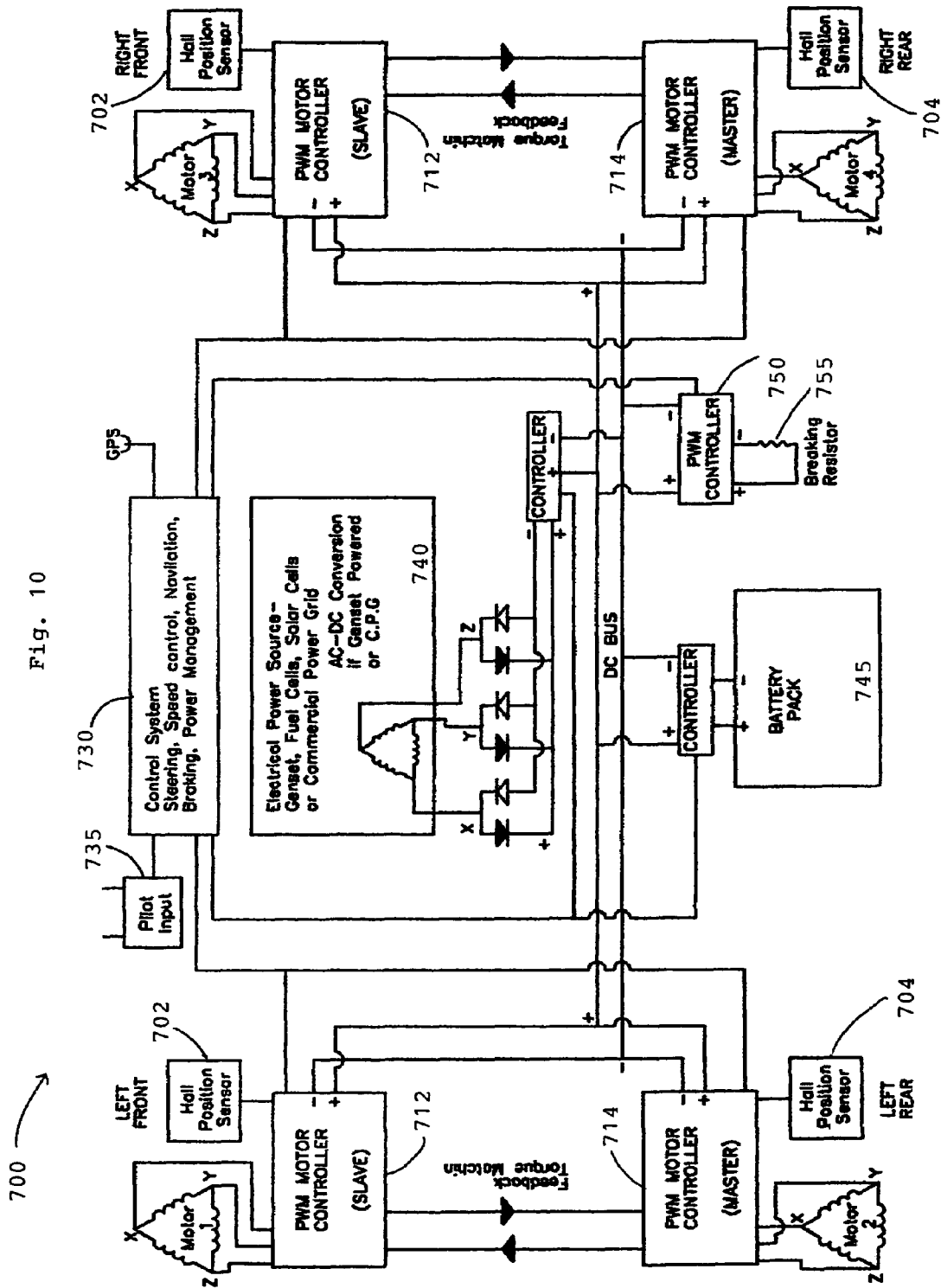
FIG. 10 is a schematic block diagram of the motor and control system used with the vehicle shown in FIG. 1.

FIG. 10 is a schematic block diagram of the drive control electronics 700 according to the present invention. This position sensing is accomplished using Hall effect sensors which pick up the position of the actual Neo permanent magnets mounted to the motor outer drum. The sensors include a left and right front sensors 702 and left and right rear sensors 704. The output of each sensor has both voltage and polarity output, which is communicated to front and rear motor control electronics 712 and 714, respectively, through wires routed through the hollow cavity 218 in the wheel mounting shaft 216. In this example, the front motor controllers 712 function as slave motor controllers and the rear motor controllers 714 function as master motor controllers. Although Hall effect sensors are preferred due to the ruggedness and their imperviousness to liquids or dust, other types of sensors can be substituted, such as resolvers and digitizers.

The electromagnets 610 are constructed of very high magnetic permeability material, and are wound with very low ohmic resistance wire windings. Due to the size of the assembly, the electromagnets 610 are constructed in bi-polar pairs. Thus, 18 pairs are used in each 36 pole assembly. The windings are, depending on speed and torque desired, connected in series or in parallel, with automatic switchover at a predetermined speed.

As shown in FIG. 10, the motor drive electronics 700 consists of control electronics 712 and 714, and pilot and navigational inputs 730. The control electronics protects the motors and vehicle from over speed, overload, too tight of turns at high speed, to high "G" forces over rough terrain. Pilot inputs 735 are simplified to speed, direction, and steering. The control electronics 700 can also navigate via GPS (not shown) to a particular course or a particular destination.

As shown in FIG. 10, each of four motor coil sets is powered by a pulse width modulated (PWM) motor control 702 and 704, and is provided with position feedback from an associated set of Hall effect sensors 702 and 704. Since two Direct Drive motors are contained in each rubber driving track 500, the rear motor control 714 is considered a "master" and is linked to the front motor control 712, which is considered a "slave". This allows precise load sharing via "torque matching".

In this example, all four motor controllers 712 and 714 are powered from the DC bus, which receives its electrical power from the electrical power source 740. The electrical power source 740 can be a genset, fuel cells, solar cells, or commercial power grid. If the source is AC, it is rectified to DC through a six pole bridge rectifier and a controller. Interconnections allow "get home capability" with any motor or motor Control to be inoperative.

The battery pack 745 can power the vehicle alone until it needs to be recharged or can power the vehicle in tandem with the main power source 740 as a hybrid. When the vehicle is braking, the generated power from the wheel motors is recovered and used to charge the battery pack 745. If the battery is fully charged, the voltage of the DC bus will raise slightly. The brake PWM Controller 750 shunts the excess voltage through a large exterior braking resistor 755 automatically.

The control system 810 in the pilothouse 800 takes pilot input for direction of travel, speed, turning, or braking, and limits the power input to prevent damage or overload. This is commonly described as "fly by wire". The precise speed and sync capability of these motors allows precise steering inputs, through feedback and regulated by the control system. The control system 730 also manages the DC bus voltage, battery usage and charging management and braking resistor power management. Power management for hybrid operation is also controlled. Additional inputs allow for fully coupled autopilot operation, with navigation references to gyro and GPS input.

Figure 11A:
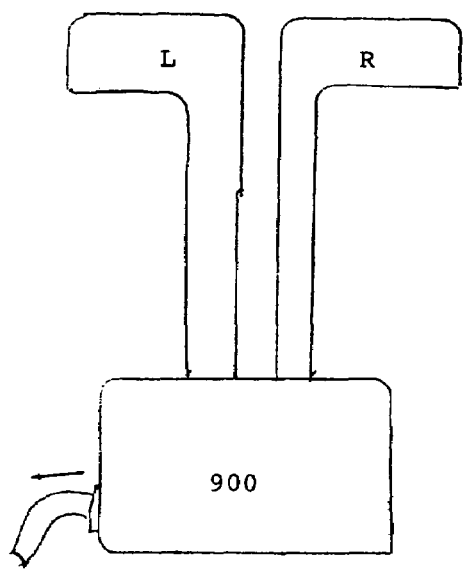
FIGS. 11a and 11b are rear and side views, respectively, of an example of a pilot control stick connected with the control system.
Figure 11B:
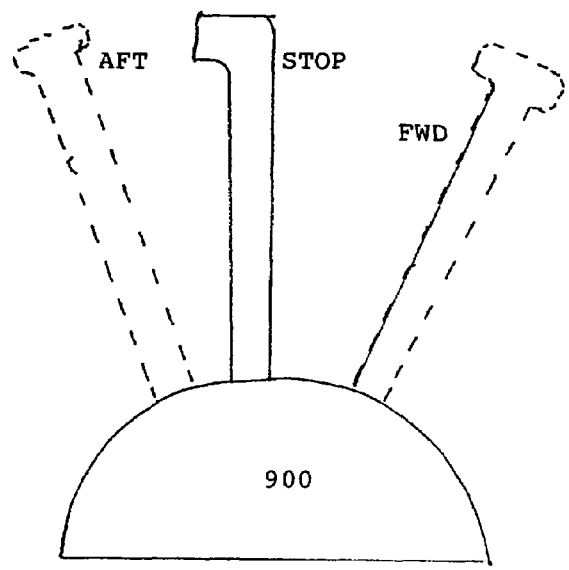
Figure 11C:
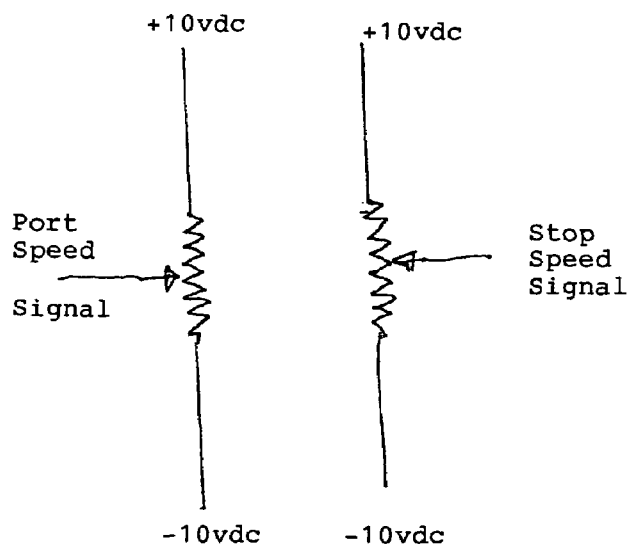
FIG. 11c is a schematic diagram of control stick connected with the control system.

FIGS. 11a and 11b shows a rear and side view, respectively, of an example of a pilot control stick 900 connected with the control system. FIG. 11c is a schematic diagram showing an example of the electrical connections of the speed steering pilot's control. In this example, moving either, or both, levers forward makes the vehicle accelerate in a forward direction. Pulling one or both of the levers rearward makes the vehicle stop, then move backward. Twisting one lever forward and one aft, makes the vehicle turn in the direction of the twist.

Figure 12:
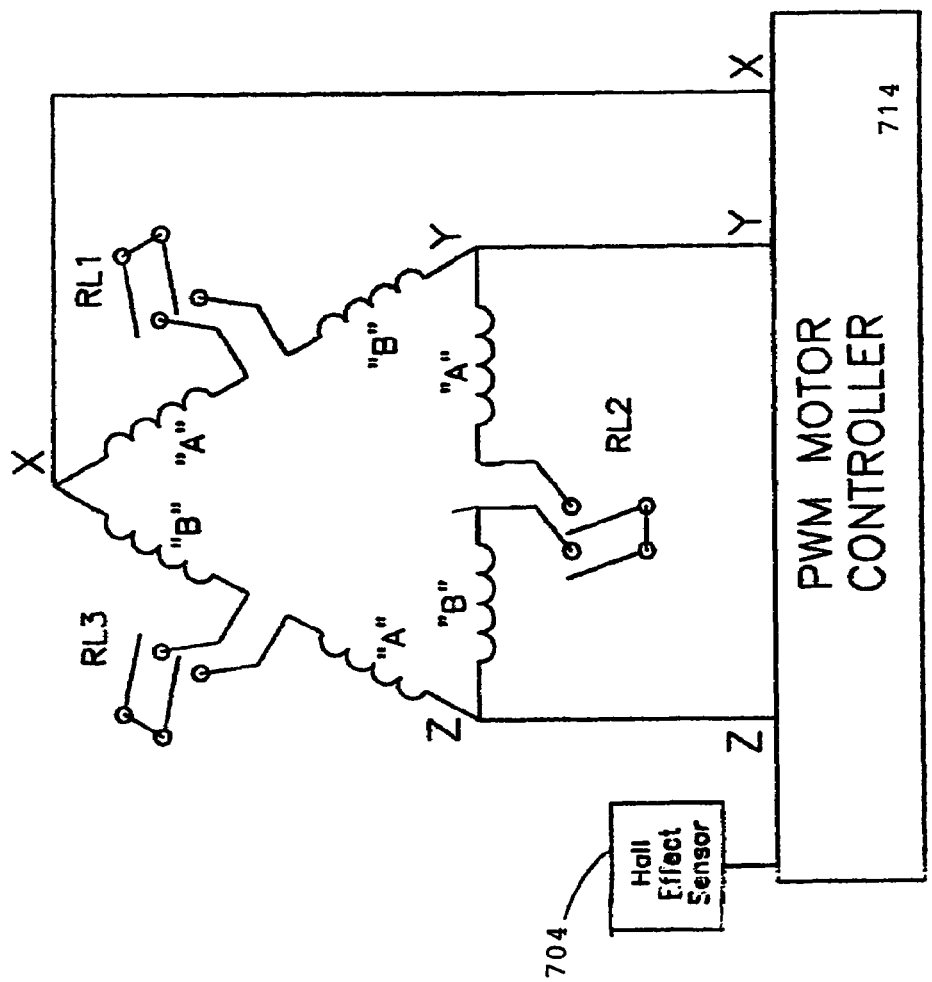
FIG. 12 shows the Low Speed/High Torque configuration of the control system.

The actual wiring of the electromagnetic poles is connected in groups of at least two per phase. FIG. 12 shows the low speed/high torque configuration, which places all 36 poles of each phase in series. Compared to the High Speed/Low Torque parallel connections, this gives double the amperage through each coil because the motor PWM controller is current limited, and the reverse EMF is low at low speed. The configuration shown in FIG. 12 doubles starting/low speed torque. The actual switching is done by RL1, RL2, RL3, which can be either mechanical relays or solid state devices. Although they are shown located near the windings, in practice they are located outside the motor.

Figure 13:
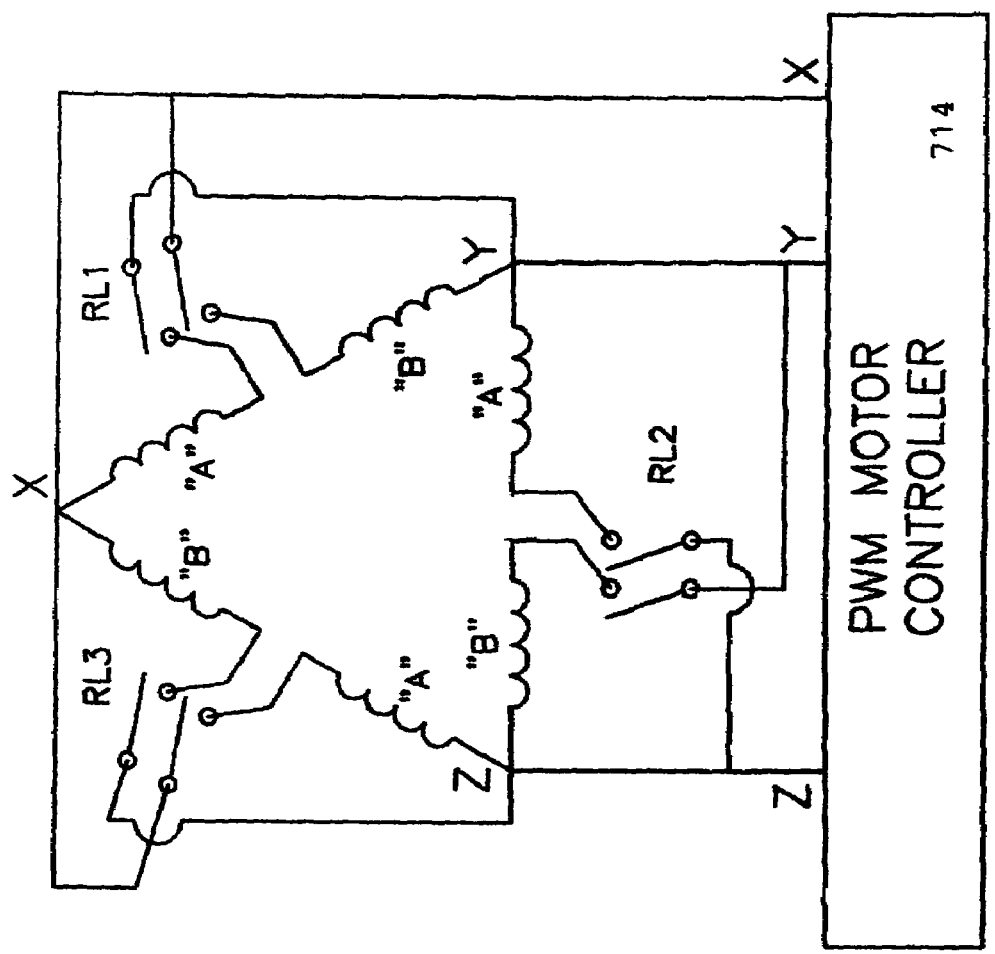
FIG. 13 shows the High Speed/Half Torque configuration of the control system.

FIG. 13 shows RL1, RL2, RL3 in high speed, half torque configuration with the relays energized. Since the reverse EMF is proportional to motor speed, at higher speed the reverse EMF substantially limits the actual current through the stator windings. The parallel configuration doubles the input voltage less the reverse RMF and makes realistic torque available at higher speeds. The configuration shown in FIG. 13 increases the top speed of the vehicle.

Although the description describes the novel invention for use in oil exploration on environmentally sensitive land such as frozen tundra, the invention can have other applications. For example, the invention can have application in military applications such in different environments such as sand and desert conditions. The invention can have application in agricultural uses such as for tractors, and farm equipment.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An electrically driven wheel for a tracked vehicle comprising:

a driving track wheel having built in cogs on an outer surface for driving a track;

a permanent magnet electric motor drive having a stationary mounting shaft running through the brushless DC motor for connecting the electrically driven wheel to a frame of the tracked vehicle, wherein the permanent magnet electric motor drive is coupled within the driving track wheel to develop rotational torque for rotating the driving track wheel allowing efficiency over approximately 95% without traditional heat losses to clutches, gear boxes, differentials, hydraulics, etc., for less heat loss to affect environment by melting frozen tundra, and motor temperature stays very close to ambient; and two end plates covering each end of the driving track wheel enclosing the brushless DC motor therein, wherein the driving track wheel directly transmits thrust loads directly to the mounting shaft.

2. The tracked vehicle of claim 1, wherein the stationary mounting shaft comprises:

hollow portion within the stationary mounting shaft for routing electrical wiring and coolant lines to operate the permanent magnet electric motor drive through stationary mounting shaft to allow the permanent magnet electric motor drive to be sealed against an environment and to prevent oil spills or water contamination.

3. The electrically driven wheel of claim 1, wherein the permanent magnet electric motor drive further comprises:

a drum having an interior and an exterior surface;

a bank of pole assemblies connected between the interior surface of the drum and the stationary mounting shaft; and electrical wiring for energizing the bank of pole assemblies, wherein the electrical wiring is routed through a hollow portion of the stationary mounting shaft between said permanent magnet electric motor drive and a tracked vehicle controller.

4. The electrically driven wheel of claim 1, further comprising:

permanent magnet high multiple pole motors for precise track control and synchronization.

5. The electrically driven wheel of claim 3, wherein the bank of pole assemblies comprises:

at least three sets of stator windings mounted to the stationary mounting shaft in a three phase arrangement; and at least three rows of magnets connected with the at least three sets of stator windings, each row arranged in a disc to turn with the drum of the permanent magnet electric motor drive.

6. The electrically driven wheel of claim 5, wherein the at least three sets of stator windings further comprise:

an offset difference between of the at least three stator windings of 0.0, −6.6 and −13.3 degrees for a 36 pole motor.

7. The electrically driven wheel of claim 5, wherein the at least three sets of stator windings further comprise:

an offset difference between of the at least three stator windings of 0.0, −5.0 and −10.0 degrees for a 48 pole motor.

8. The electrically driven wheel of claim 3, wherein the bank of pole assemblies comprises:

special permanent magnet material and mounting to permit operations as low as −50 degrees C. and as high as +50 degrees C.

9. The tracked vehicle of claim 1, wherein said permanent magnet electric motor drive is sealed with said end plates and pressurized with inert gas for water protection.

10. The tracked vehicle of claim 1, further comprising:

a liquid coolant for cooling and heating said permanent magnet electric motor drive.

11. A drive system for a tracked vehicle comprising:

a track module frame for connecting the drive system with a chassis of the tracked vehicle;

at least two electrically driven track wheels connected with the track module frame, each one of the at least two electrically driven track wheels includes:

a driving track wheel having plural built in cogs on an outer surface for driving the flexible track; and a permanent magnet motor drive having a stationary mounting shaft inside the driving track wheel to develop rotational torque to allow efficiency over approximately 95% without traditional heat losses to clutches, gear boxes, differentials and hydraulics to maintain a motor temperature of approximately ambient, the at least two electrically driven track wheels distribute stress in the flexible track to reduce environmental disturbance;

at least two flexible tracks each coupled with two of the at least two electrically driven track wheels, wherein each of the at least two flexible tracks travel around the corresponding electrically driven track wheel; and a controller for controlling the at least two electrically driven track wheels in response to a driver command.

12. The system of claim 11, wherein each of the at least two flexible tracks comprise:

plural track cogs on an inner surface of the flexible track to mate with the plural built in cogs on the outer surface of the driving track wheel.

13. The system of claim 11, wherein the electrically driven motor comprises:

a hollow shaft within the stationary mounting shaft to route electrical wiring and coolant lines; and end covers enclosing said electrically driven motor within the driving track wheel, wherein a thrust load is transmitted to the stationary mounting shaft.

14. The system of claim 11, wherein the electrically driven motor comprises:

permanent magnet high multiple pole motors for precise track control and synchronization.

15. The system of claim 11, wherein the controller comprises:

an interface for communicating with a vehicle control electronics;

at least four sensors for sensing a position of the at least four electrically driven wheels; and at least four controllers each connected with one of the at least four sensors and a corresponding one of the left and right front and rear electrically driven wheels for energizing the left and right front and rear electrically driven motors in response to a command from the vehicle control electronics.

16. The system of claim 11, wherein said controller comprises:

a control system for automatic protection against overload, over current, over speed, too tight turn at high speed and a top speed based on G-loads of rough terrain.

17. The system of claim 11, wherein each one of the at least two flexible tracks include full torque capability in a forward and a reverse direction.

18. The system of claim 11, wherein each of the at least two flexible tracks is selected from one of:
low temperature flexibility rubber tracks and steel tracks.

19. A drive system for a tracked vehicle comprising:
a track module frame for connecting the drive system with a chassis of the tracked vehicle;
at least two electrically driven track wheels connected with the track module frame;
at least two flexible tracks each coupled with two of the at least two electrically driven track wheels, wherein each of the at least two flexible tracks travel around the corresponding electrically driven track wheel; and
a controller for controlling the at least two electrically driven track wheels in response to a driver command, the controller including a control system for automatic protection against overload, over current, over speed, too tight turn at high speed and a top speed based on G-loads of rough terrain.

20. The system of claim 19, wherein each one of the at least two electrically driven track wheels comprises:
a driving track wheel having plural built in cogs on an outer surface for driving the flexible track; and
an electrically driven motor having a stationary mounting shaft inside the driving track wheel to develop rotational torque, wherein the at least two electrically driven track wheels distribute the stress in the flexible track to reduce environmental disturbance.

21. The system of claim 19, wherein each of the at least two flexible tracks comprise:
plural track cogs on an inner surface of the flexible track to mate with the plural built in cogs on the outer surface of the driving track wheel.

22. The system of claim 20, wherein the electrically driven motor comprises:
a hollow shaft within the stationary mounting shaft to route electrical wiring and coolant lines; and
end covers enclosing said electrically driven motor within the driving track wheel, wherein a thrust load is transmitted to the stationary mounting shaft.

23. The system of claim 20, wherein the electrically driven motor comprises:
permanent magnet high multiple pole motors for precise track control and synchronization.

24. The system of claim 20, wherein each of the at least two electrically driven wheels comprises:
permanent magnet electric motor drive which allows efficiency over approximately 95% without traditional heat losses to clutches, gear boxes, differentials and hydraulics to maintain a motor temperature of approximately ambient.

25. The system of claim 19, wherein the controller comprises:
an interface for communicating with a vehicle control electronics;
at least four sensors for sensing a position of the at least four electrically driven wheels; and
at least four controllers each connected with one of the at least four sensors and a corresponding one of the left and right front and rear electrically driven wheels for energizing the left and right front and rear electrically driven motors in response to a command from the vehicle control electronics.

26. The system of claim 19, wherein each one of the at least two flexible tracks include full torque capability in a forward and a reverse direction.

27. The system of claim 19, wherein each of the at least two flexible tracks is selected from one of:
low temperature flexibility rubber tracks and steel tracks.

* * * * *